Dec. 29, 1942.    C. S. ASH    2,306,856
DUAL WHEEL VEHICLE
Filed Sept. 13, 1938    4 Sheets-Sheet 1

INVENTOR
Charles S. Ash
BY
Morgan Finnegan & Durham
ATTORNEYS

Dec. 29, 1942.     C. S. ASH     2,306,856
DUAL WHEEL VEHICLE
Filed Sept. 13, 1938     4 Sheets-Sheet 2

INVENTOR
Charles S. Ash
BY Morgan Finnegan & Durham
ATTORNEYS

Dec. 29, 1942.  C. S. ASH  2,306,856
DUAL WHEEL VEHICLE
Filed Sept. 13, 1938  4 Sheets-Sheet 4

INVENTOR
Charles S. Ash
BY Morgan, Finnegan & Durham
ATTORNEYS

Patented Dec. 29, 1942

2,306,856

UNITED STATES PATENT OFFICE 2,306,856

DUAL WHEEL VEHICLE

Charles S. Ash, Milford, Mich.

Application September 13, 1938, Serial No. 229,697

1 Claim. (Cl. 180—22)

The invention relates to new and useful improvements in driving dual wheel and axle assemblies, and more particularly to novel improvements in such assemblies employing differential gear connections between the driving axle and the traction wheels and the braking means acting upon the wheels.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
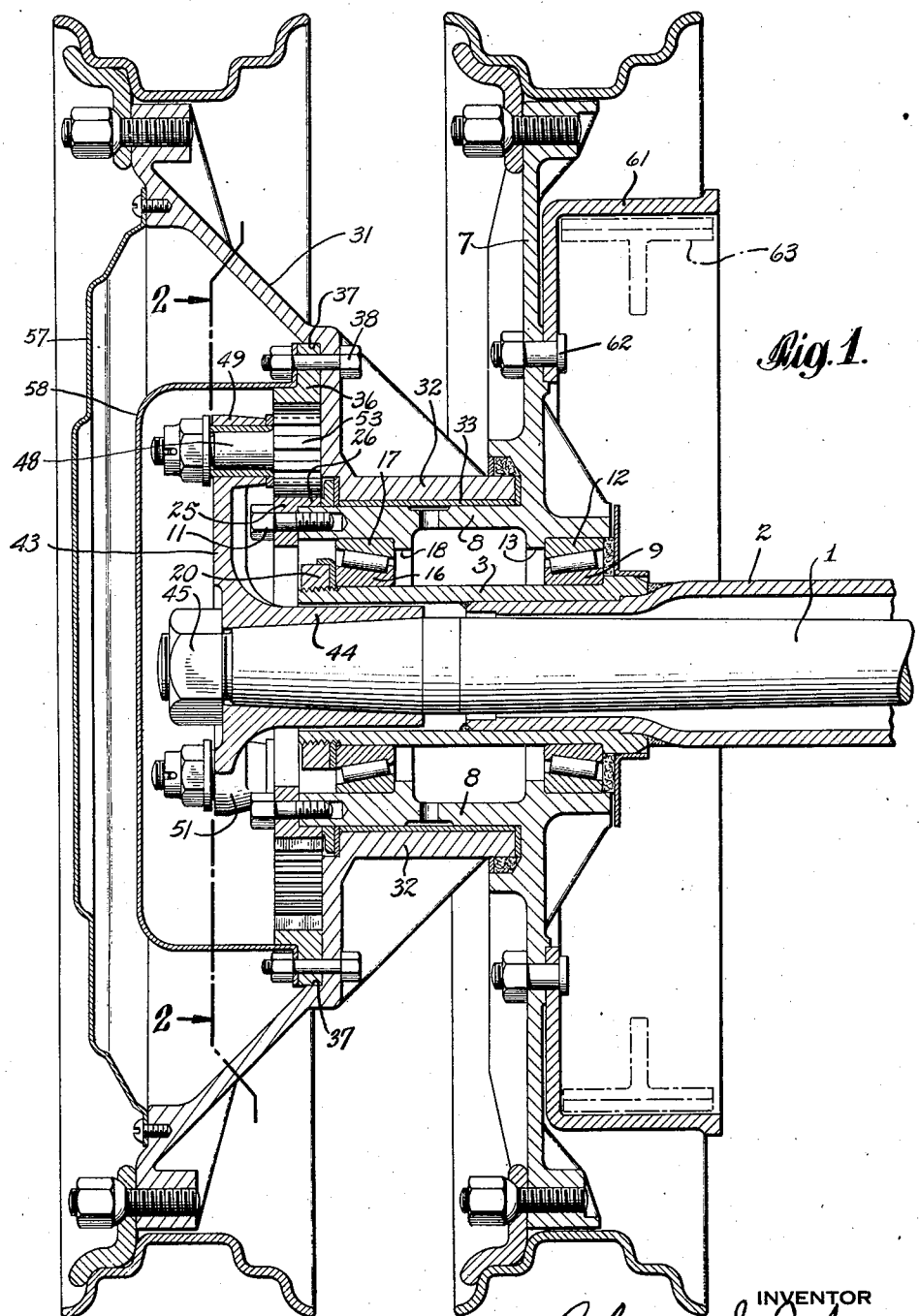
Fig. 1 is a longitudinal section through a driving dual wheel and axle assembly embodying the invention.

Objects of the invention are to provide dual wheel driving units for automotive vehicles which are highly efficient for road service in heavy-duty vehicles, are of very simple, compact and sturdy construction, in which the component parts are themselves few, and are of simple structure, and embody or closely approximate forms and structures which have become standard or otherwise known as conducing to economy and ease of manufacture, to simple and ready assembly, and also conducing to road efficiency, esspecially with heavy-duty vehicles; to provide such units embodying the before-enumerated advantages, together with others, and which employ differential gearing mechanism to permit and control the differential rotation of the driven dual wheels, and in connection therewith employ simple and highly efficient braking mechanism; to provide such units having structure and facilities for interchangeably taking differential gear units of different kinds without requiring other structural changes in the unit, one form of differential gearing being removable from the assembly and a different form of differential gearing being insertable in its place.

With these and other objects in view, the present preferred embodiment, herewith exemplarily disclosed, comprises a full floating axle of known or other suitable form, the drive of the motor being transmitted to the axle through a driving shaft connected to a suitable differential of any standard or other suitable form, the axle being enclosed within the usual housing, which is connected to the vehicle chassis by suitable spring mechanisms. The side-by-side dual wheels are of simple and strong structure or design, approximating closely to commercial practice, the outwardly-extending hub of the inner wheel encircling the housing and being rotatively mounted thereon by means of radial thrust roller bearings. The inwardly-extending hub of the outer wheel is rotatively journalled on the hub of the inner wheel. Between the driving axle and the wheels are structural means for mounting interchangeably different forms of differential gear drives and connections, by simply unbolting one form of differential, removing it, replacing a different form of differential gearing in the same seat, and fastening it by the same bolts. In one form of the differential gear mechanism, an external gear ring fits into an annular seat in the flat outer face of the outwardly-extending hub of the inner wheel, and a larger internal gear ring fits into an annular seat formed in the outer face of the outer wheel, the two gear rings being in the same vertical plane, which is substantially that of the end of the non-rotatable housing. A plurality of spur pinions, preferably three in number, are in mesh with both gear rings, the pinions being rotatively mounted on the arms of a spider which is fixed to the end of the driven axle and rotates therewith. In the other shown form a crown gear ring is seated in and fixed to the before mentioned seat on the outer end of the hub of the inner wheel, and a housing or cradle is seated in the before mentioned annular seat formed in the outer face of the outer wheel, and this housing carries a crown gear ring of the same diameter. Interposed between the crown gear rings and meshing with both are bevel pinions which are rotatably mounted on an interchangeable, removal and replaceable spider, mounted on a hub which is fixed to the driving axle, in the same manner as the spur pinions of the previously described form. Braking mechanism is provided comprising a brake drum fixed to the inner face of the inner wheel, the drum being of usual construction and located in the usual position convenient for the application of mechanical or hydraulic control mechanisms.

The whole construction constitutes a driven dual wheel assembly of few, sturdy and simply designed parts, very compactly assembled, the wheels being journalled directly upon the non-rotatable housing, and being driven directly from the axle, with the simple, sturdy and interchangeable differential gearing directly connecting the axle and the wheels, and the brake drum being fixed to the inner side of the inner wheel and thus being conformable to a commonly used design and arrangement. It will be understood that the foregoing general description, and the following detailed description as well, are exemplary and explanatory but are not restrictive of the invention.

Referring now in detail to the embodiment of the invention illustrated by way of example in the accompanying drawings, an axle 1 is driven from any suitable differential, not shown, the axle being within the non-rotatable housing 2, which supports the vehicle chassis by any known or convenient spring construction. The housing 2 has at its outer end a cylindrical part 3, fixed to the housing by welding or otherwise, and constituting an extension of the housing. The inner wheel 7 has its outwardly-extending hub 8 encircling but spaced away from and rotatably mounted on the part 3 of the non-rotatable housing 2. As embodied, there is mounted on the outside of part 3 two radial thrust roller bearings, the inside race ring 9 of the inner bearing abutting on an annular shoulder formed on the part 3 of the housing, and the outside race ring 12 of the inner bearing abutting on an inwardly-projecting annular shoulder 13 formed on the interior of the hub 8. The outer anti-friction bearing has its inside ring 16 mounted on the housing 3, and its outside race ring 17 abutting on an annular, inwardly-projecting shoulder 18 formed on the inside of the hub 8. A locknut 20 is screw-threaded on the end of the housing member 3 to hold the bearing in place. Fitted tightly against and about the flat, annular outer end of the hub 8 is an external gear ring 25. This ring 25 has a projecting annular flange 26 encircling and fitting tightly over the end periphery of the hub, and has also an inner face portion which abuts on the flat outer face of the hub making a tight cap-like fit over the hub end. The gear ring is fastened to the hub by screw bolts 11.

The outer wheel 31 has its inwardly-projecting hub 32 rotatively mounted on the exterior of the outwardly-projecting hub 8 of the inner wheel 7, and there is preferably an anti-friction bushing 33 interposed between the hubs. Formed in the outer face of wheel 31 is an annular recessed seat 37, and the periphery of an internal gear ring 36 fits into the annular seat 37, the flat inner face of the ring resting on the flat outer face of the wheel 31, thus providing a secure seat for the gear ring 36. The ring is fixed to the wheel by screw bolts 38. The two gear rings, one within the other and spaced apart, are preferably approximately in the vertical plane of the end of the axle housing 2.

Figure 2:
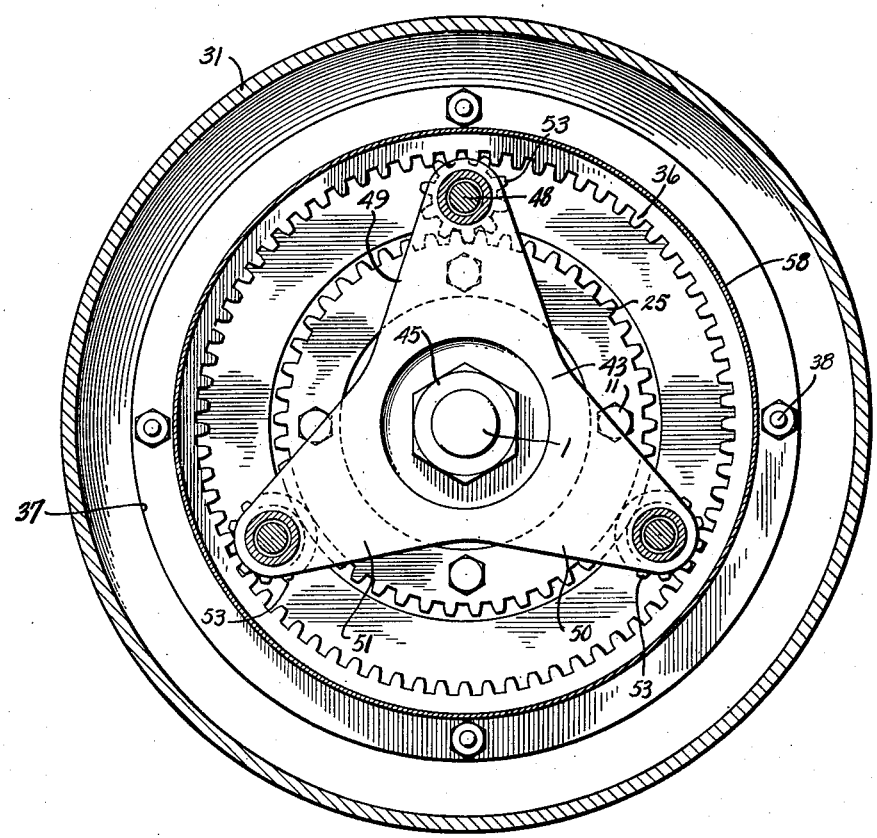
Fig. 2 is a section on line 2—2 of Fig. 1.

Mounted on the outer end of the axle 1, and close in front of the gear rings is a pinion-supporting spider 43, having an apertured hub or socket 44 shown as having a tight taper fit on the end of the axle 1, and further secured by a suitable key or other fastening device. A lock nut 45 also holds the spider in fixed relation to the axle. The spider 43 is shown with three arms 49, 50 and 51, and rotatably mounted in each of the three arms is a spur pinion 53, each pinion having a stub shaft 48 journaled in the end of one of the spider arms, all of the pinions meshing with both gear rings 25 and 26. In Figs. 1 and 2 the spider is shown integral, and to employ the interchangeable feature it would be necessary to remove the spider from the shaft 1. The spider, however, can be of the form shown in Figs. 3 and 4, wherein an annular plate having arms, in each of which arms a pinion is journaled, is fitted upon and bolted to a short end flange integral with a hub on the axle. This alternative construction is later described. Suitable caps 57 and 58 may be employed as closures over the mechanism, if desired, and cap 58 may hold lubricant for the gearing. In the embodied form of braking mechanism, a brake drum 61, which may be of standard or other suitable form, is fixed to the inner face of the inner wheel by suitable means such as bolts 62. Any suitable form of brake shoes 63 may be employed, and mechanical or hydraulic actuators and controls for the brake shoes may likewise be employed.

Figure 3:
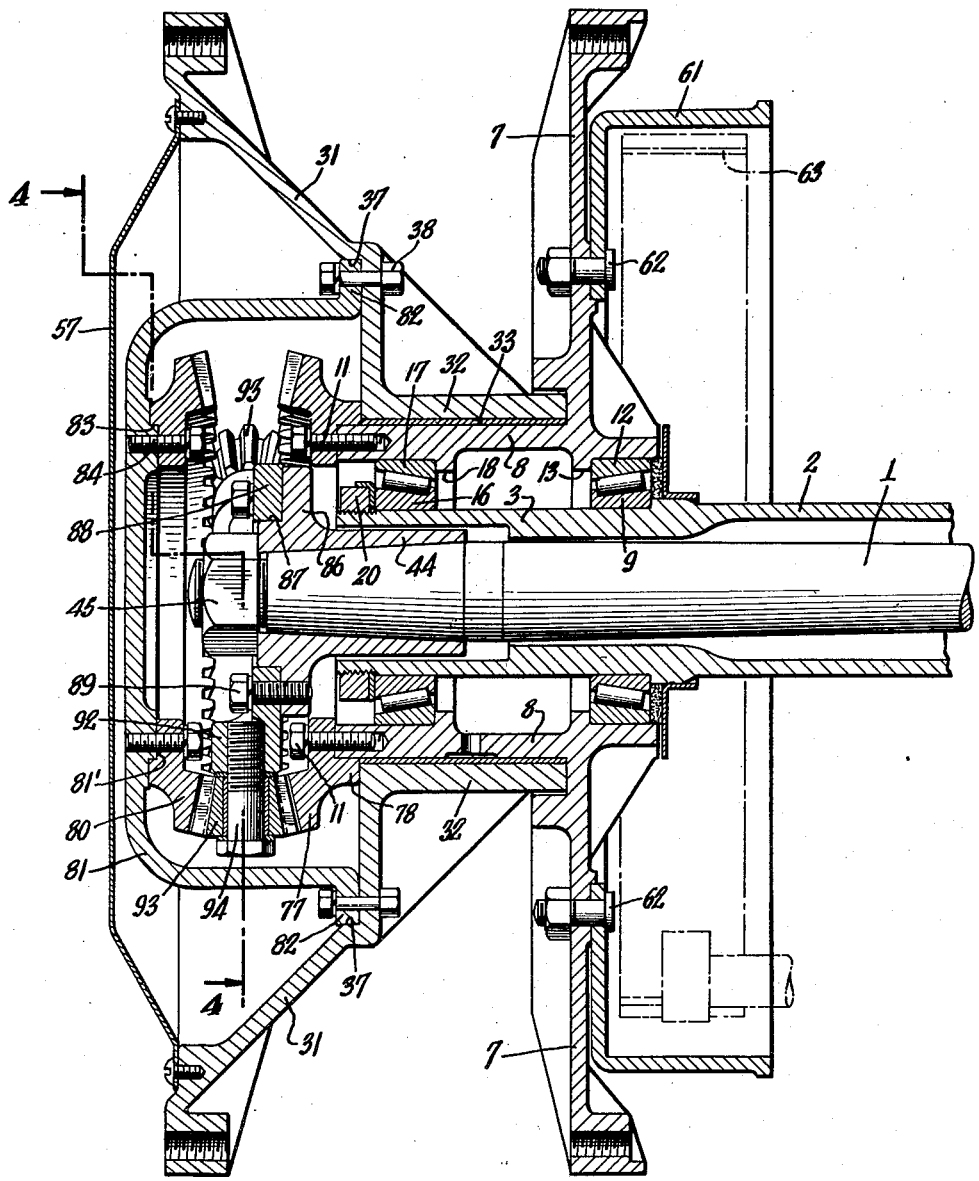
Fig. 3 is a section similar to Fig. 1, but showing a different form of differential gear drive.
Figure 4:
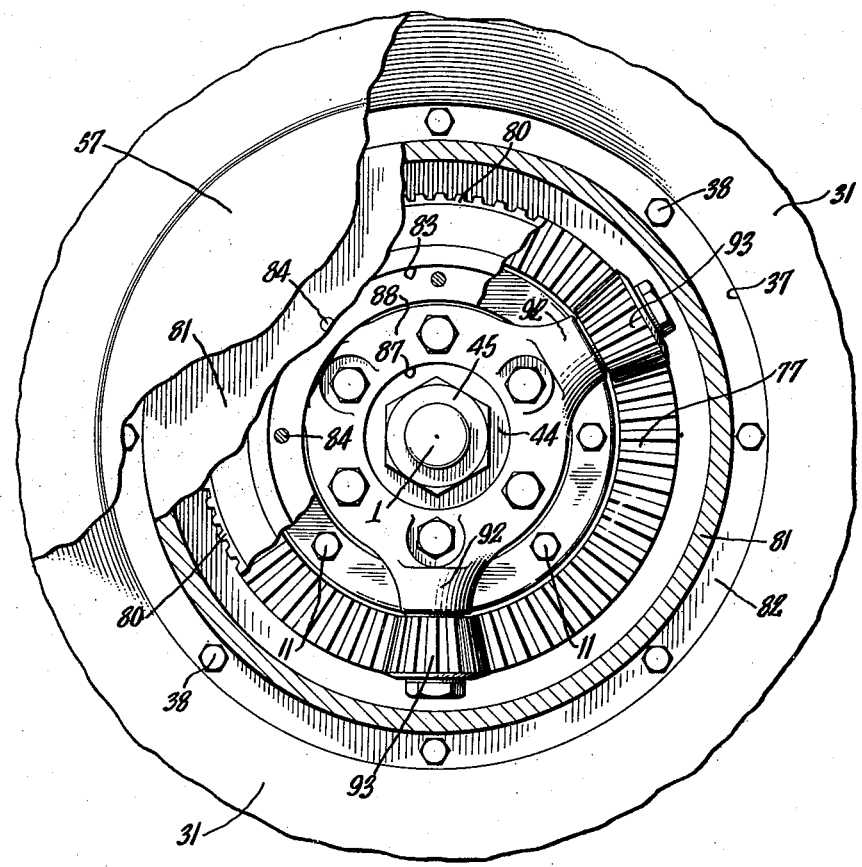
Fig. 4 is a partial elevation and a partial section on line 4—4 of Fig. 3.

In Figs. 3 and 4 are shown more fully an embodied form of facilities and structure providing full interchangeability of the differential gearings, and showing also the application of a bevel gear differential to the drive and braking connections. As there shown a crown bevel gear ring 77 is interchangeable with the internal gear ring 25, and ring 77 on its back part is of the same form as gear ring 25. That is, it has a projecting annular flange 78 which tightly encircles the end of the hub 8 of the inboard wheel 7, and a perpendicularly-disposed inner face which fits against the flat outer end of the hub, the ring 77 being fixed to the hub by the screw bolts 11. Likewise a crown bevel gear ring 80 is interchangeable with internal gear ring 36, and, as embodied, a cradle or housing 81 has an outwardly-extending annular flange 82, which fits tightly into the recessed annular seat 37, formed in the outer face of the outboard wheel 31, in the same way as does the gear ring 36 as already described, and is fixed in position by the screw bolts 38. On the inner face of housing 81 is formed an annular outwardly-projecting seat 81'. A crown bevel gear ring 80 has an annular shouldered back face 83 which fits about and over the seat 82, and the ring is fixed in place by screw bolts 84. In these figures the hub 44 is shown permanently mounted on the axle 1, but having interchangeable pinions, the pinions being journaled on supporting arms which are integral with and extend out from a ring plate mounted on and demountable from the hub. These arms are shown in this instance carrying bevel pinions intermeshing with both crown bevel gears. The hub 44 is shown with an integral flange, having a peripheral shouldered annular recess 87 formed therein, the shouldered recess being concentric with the axle 1. Fitting tightly over the shouldered annular periphery of flange 86 is an annular plate 88, the flat inner face of which abuts on the flat outer faces of the recess 87 in flange 86, the plate 88 being fixed to the flange by screw bolts 89. Integral with and extending radially outwardly from ring plate 88 are arms 92, and journaled in the end of each arm is a bevel pinion 93, mounted revolubly on a screw pin 94, the pinions intermeshing with both gear rings 77 and 80. The spur pinions 53 may be journaled on arms formed on an interchangeable ring plate similar to plate 88 and arms 92, and those pinions would intermesh with the internal and external gear rings, as shown in Figs. 1 and 2.

In straight-away driving, when the brakes are applied to the brake drums 61, the inboard wheels 7 are rotationally retarded and through the differential tend to rotationally accelerate the outboard wheels 31, that acceleration, however, being opposed by the rolling traction pressure of the outer wheels upon the road, and the resultant is the desired retardant action of the brakes against the motor drive and the inertia of the vehicle. When turning, the usual differential operates as to the two pairs of wheels in the usual manner, the pair on the outside of the curve being overdriven and the pair on the inside of the corner being underdriven to compensate for the difference in the different lengths of the track in making the curve. In addition, the outboard wheel of the inner pair has a shorter track than the inboard wheel of that pair and the outboard wheel tends to slow down relatively to the axle drive and to speed up the inboard wheel relatively to the axle drive. The inboard wheel absorbs this acceleration in so far as required by its longer track, but resists any further accelerative tendency by its tractional pressure on the road. Thereby the inboard wheel is decelerated sufficiently to compensate for its shorter track while the outboard wheel rotates normally for its length of track, and whatever resultant retardant action is exerted on the axle 1 is compensated for in the differential. On the other side, that is, the outer side of the vehicle, in making the turn, the outboard wheel is accelerated to compensate for its longer track and this exerts through the differential a retardant effect on the rotation of the inboard wheel, which is absorbed wholly or in part by the shorter track of the inner wheel, and any excess is resisted by the tractional pressure of the inner wheel on the road. Any excess accelerative tendency on the outer wheel is imparted to the shaft 1, and thence to the usual differential which operates to effect a balance of drive or torque between the two pairs in the usual manner.

The invention in its broader aspects is not limited to the specific mechanisms shown and described but departures may be made therefrom within the scope of the accompanying claim without departing from the principles of the invention and without sacrificing its chief advantages.

What I claim is:

A dual wheel drive for an automotive vehicle including in combination an axle housing enclosing a driven axle shaft, dual wheels, the hub of one of said wheels being rotatably mounted on said axle housing, the hub of the other wheel being rotatably mounted on the hub of the first-mentioned wheel, a crown bevel gear mounted on the hub of said first-mentioned wheel, a support for a gear ring mounted on the other wheel and a crown gear ring mounted on said gear ring support, a pinion support fixed to the end of the shaft and having radially outwardly extending pinion supporting members rotating therewith, and a plurality of pinions rotatably mounted on said support and meshing with both gear rings, said gear ring support overhanging said pinions and enclosing said gears and pinions.

CHARLES S. ASH.